US010054348B2

(12) United States Patent
Shin et al.

(10) Patent No.: US 10,054,348 B2
(45) Date of Patent: Aug. 21, 2018

(54) AIR CONDITIONER

(71) Applicant: LG ELECTRONICS INC., Seoul (KR)

(72) Inventors: Kwangho Shin, Seoul (KR); Hojong Jeong, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/992,556

(22) Filed: Jan. 11, 2016

(65) Prior Publication Data

US 2016/0201963 A1 Jul. 14, 2016

(30) Foreign Application Priority Data

Jan. 12, 2015 (KR) .................. 10-2015-0004223

(51) Int. Cl.
*F25B 49/02* (2006.01)
*F25B 6/02* (2006.01)
*F25B 27/00* (2006.01)
*F25B 13/00* (2006.01)
*F25B 27/02* (2006.01)
(Continued)

(52) U.S. Cl.
CPC ............... *F25B 49/02* (2013.01); *F24F 1/08* (2013.01); *F24F 12/00* (2013.01); *F25B 6/02* (2013.01); *F25B 13/00* (2013.01); *F25B 27/00* (2013.01); *F25B 27/02* (2013.01); *F25B 2313/0253* (2013.01); *F25B 2327/001* (2013.01)

(58) Field of Classification Search
CPC ...... F25B 27/02; F25B 6/02; F25B 2327/001; F25B 2313/0253; F24F 1/08; F24F 12/00
See application file for complete search history.

(56) References Cited

U.S. PATENT DOCUMENTS 3,984,224 A 10/1976 Dawkins
4,051,691 A 10/1977 Dawkins
(Continued)

FOREIGN PATENT DOCUMENTS

CN 1403762 3/2003
CN 2600742 1/2004
(Continued)

OTHER PUBLICATIONS

Korean Notice of Allowance dated May 25, 2016 issued in Application No. 10-2015-0004227.
(Continued)

*Primary Examiner* — Emmanuel Duke
(74) *Attorney, Agent, or Firm* — KED & Associates, LLP

(57) ABSTRACT

An air conditioner is provided. The air conditioner may include at least one indoor device, an electric heat pump (EHP) outdoor device connected with the at least one indoor device, and having a first compressor driven using electric power and a first outdoor heat exchanger, and a gas heat pump (GHP) outdoor device connected with the at least one indoor device, and having an engine that drives a second compressor using a combustion gas and a second outdoor heat exchanger. The GHP outdoor device may include an exhaust gas heat exchanger that performs heat exchange between a refrigerant flowing through the EHP outdoor device and an exhaust gas of the engine.

17 Claims, 2 Drawing Sheets

(51) Int. Cl.
*F24F 1/08* (2011.01)
*F24F 12/00* (2006.01)

(56) References Cited

U.S. PATENT DOCUMENTS

| | | | | |
|---|---|---|---|---|
| 4,614,090 | A | * | 9/1986 | Kaneko ................. F25B 13/00 62/158 |
| 5,279,131 | A | | 1/1994 | Urushihata et al. |
| 5,526,649 | A | | 6/1996 | Sada |
| 5,673,570 | A | | 10/1997 | Sada |
| 6,735,969 | B2 | | 5/2004 | Kasagi et al. |
| 9,909,784 | B2 | | 3/2018 | Toya et al. |
| 2002/0050351 | A1 | * | 5/2002 | Yoshimura ................. F02G 5/00 165/240 |
| 2004/0050093 | A1 | | 3/2004 | Lifson et al. |
| 2004/0134218 | A1 | | 7/2004 | Alexandre |
| 2005/0086954 | A1 | | 4/2005 | Song et al. |
| 2005/0257565 | A1 | | 11/2005 | Lee et al. |
| 2008/0034777 | A1 | | 2/2008 | Copeland et al. |
| 2010/0107665 | A1 | | 5/2010 | Kawano et al. |
| 2010/0198415 | A1 | | 8/2010 | Kawano et al. |
| 2014/0116673 | A1 | | 5/2014 | Kang et al. |
| 2014/0360222 | A1 | * | 12/2014 | Masui ................. F24F 1/16 62/507 |
| 2015/0027154 | A1 | | 1/2015 | Lee et al. |
| 2016/0245536 | A1 | | 8/2016 | Iwasaki |
| 2016/0252261 | A1 | | 9/2016 | Cha et al. |
| 2016/0356534 | A1 | | 12/2016 | Hatada et al. |
| 2017/0082334 | A1 | | 3/2017 | Kawagoe et al. |
| 2018/0031287 | A1 | | 2/2018 | Nagae et al. |

FOREIGN PATENT DOCUMENTS

| | | |
|---|---|---|
| CN | 101000182 | 7/2007 |
| CN | 101012989 | 8/2007 |
| EP | 1 202 005 | 5/2002 |
| EP | 1 288 592 | 3/2003 |
| EP | 1 628 094 | 2/2006 |
| EP | 1 882 890 | 1/2008 |
| EP | 1 882 891 | 1/2008 |
| JP | 07-332815 | 12/1995 |
| JP | 08-254371 | 10/1996 |
| JP | 11-315719 A | 11/1999 |
| JP | 2000-097515 | 4/2000 |
| JP | 2002-130743 | 5/2002 |
| JP | 2002-168539 | 6/2002 |
| JP | 2003-021416 | 1/2003 |
| JP | 2003021416 A * | 1/2003 |
| JP | 2003-194384 | 7/2003 |
| JP | 2006-194467 | 7/2006 |
| JP | 2007225141 A * | 9/2007 |
| JP | 2008-157557 | 7/2008 |
| JP | 2008-309383 | 12/2008 |
| JP | 2009-079813 | 4/2009 |
| JP | 2011-75162 | 4/2011 |
| JP | 2011075162 A * | 4/2011 |
| JP | 2012 007868 | 1/2012 |
| JP | 2014-092344 | 5/2014 |
| KR | 10-0199325 | 6/1999 |
| KR | 10-2003-0077857 A | 10/2003 |
| KR | 10-2004-0085540 | 10/2004 |
| KR | 10-2005-0043089 A | 5/2005 |
| KR | 10-2005-0112151 | 5/2006 |
| KR | 10-0575682 | 5/2006 |
| KR | 10-2007-0014952 | 2/2007 |
| KR | 10-0765563 | 10/2007 |
| KR | 10-2010-0002770 | 1/2010 |
| KR | 10-2010-0069188 | 6/2010 |
| KR | 10-2010-0129138 | 12/2010 |
| KR | 10-2014-0052339 A | 5/2014 |
| WO | WO 2008/084657 | 7/2008 |
| WO | WO 2014/065548 | 5/2014 |

OTHER PUBLICATIONS

European Search Report dated May 25, 2016 issued in Application No. 15202910.4.
European Search Report dated Jun. 23, 2016 issued in Application No. 16150602.7.
Korean Office Action dated Jun. 28, 2016 issued in Application No. Oct. 2015-004178.
Korean Notice of Allowance dated Dec. 26, 2016 issued in Application No. 10-2015-0004175.
Korean Notice of Allowance dated Dec. 26, 2016 issued in Application No. 10-2015-0004178.
Korean Notice of Allowance dated Jan. 10, 2017 issued in Application No. 10-2015-0004275.
Korean Office Action dated Dec. 4, 2015 issued in Application No. 10-2015-0004180.
European Search Report dated Jun. 23, 2016 issued in Application No. 16150587.0.
Korean Notice of Allowance dated Jul. 26, 2016 issued in Application No. 10-2015-0004223.
Korean Office Action dated Jan. 4, 2016 issued in Application No. 10-2015-0004227.
Korean Office Action dated Nov. 27, 2015 issued in Application No. 10-2015-0004174.
Korean Office Action dated Aug. 12, 2016 issued in Application No. 10-2015-0004180.
European Search Report dated May 13, 2016 issued in Application No. 16150788.4.
European Search Report dated May 31, 2016 issued in Application No. 16150596.1.
European Search Report dated May 31, 2016 issued in Application No. 16150600.1.
Korean Office Action dated Jul. 25, 2016 issued in Application No. 10-2015-0004275.
U.S. Office Action dated Jul. 6, 2017 issued in co-pending U.S. Appl. No. 14/992,460.
U.S. Notice of Allowance dated Jul. 18, 2017 issued in co-pending U.S. Appl. No. 14/993,796.
U.S. Notice of Allowance dated Sep. 7, 2017 issued in co-pending U.S. Appl. No. 14/993,693.
U.S. Office Action dated Nov. 14, 2017 issued in co-pending U.S. Appl. No. 14/991,135.
English Translation of JP 2011-075162 (previously cited on Aug. 11, 2016).
U.S. Office Action dated Jan. 12, 2018 issued in co-pending U.S. Appl. No. 14/991,247.
U.S. Notice of Allowance dated Mar. 15, 2018 issued in co-pending U.S. Appl. No. 14/990,570.
U.S. Office Action dated Jun. 4, 2018 issued in U.S. Appl. No. 14/991,135.
Chinese Office Action dated Apr. 18, 2018 issued in Application No. 201510885360.9 (with English Translation).

* cited by examiner

AIR CONDITIONER

CROSS-REFERENCE TO RELATED APPLICATION

This application claims priority under 35 U.S.C. § 119 to Korean Patent Application No. 10-2015-0004223, filed in Korea on Jan. 12, 2015, whose entire disclosure is hereby incorporated by reference.

BACKGROUND

1. Field

An air conditioner is disclosed herein.

2. Background

An air conditioner is an apparatus that cools, warms, or purifies indoor air to provide a comfortable indoor environment for a user. The air conditioner may be classified as an electric heat pump (EHP) type, which uses electric power, or a gas heat pump (GHP) type, which uses a gas fuel, such as liquid petroleum gas (LPG) or liquefied natural gas (LNG), according to a power source for driving a compressor. In the GHP type, an engine is operated by burning the gas fuel, and thus, the compressor is driven.

A conventional EHP type air conditioner is disclosed in Korean Patent Application No. 10-2003-0077857, which is hereby incorporated by reference. In the conventional EHP type air conditioner, the compressor may be easily controlled by adjusting a supply current. Thus, it is possible to respond to a partial load, and high energy efficiency may be obtained. However, the EHP type air conditioner has a problem in which frost is generated at an outdoor heat exchanger when a low temperature warming operation is performed.

A conventional GHP type air conditioner is also disclosed in Korean Patent Application No. 10-2003-0077857. The conventional GHP type air conditioner has excellent defrost performance from using waste heat of an engine, but also has a problem in that engine efficiency is low due to heat loss, for example. Therefore, an air conditioner having further improved performance and efficiency is required.

BRIEF DESCRIPTION OF THE DRAWINGS

Embodiments will be described in detail with reference to the following drawings in which like reference numerals refer to like elements, and wherein.

DETAILED DESCRIPTION

Figure 1:
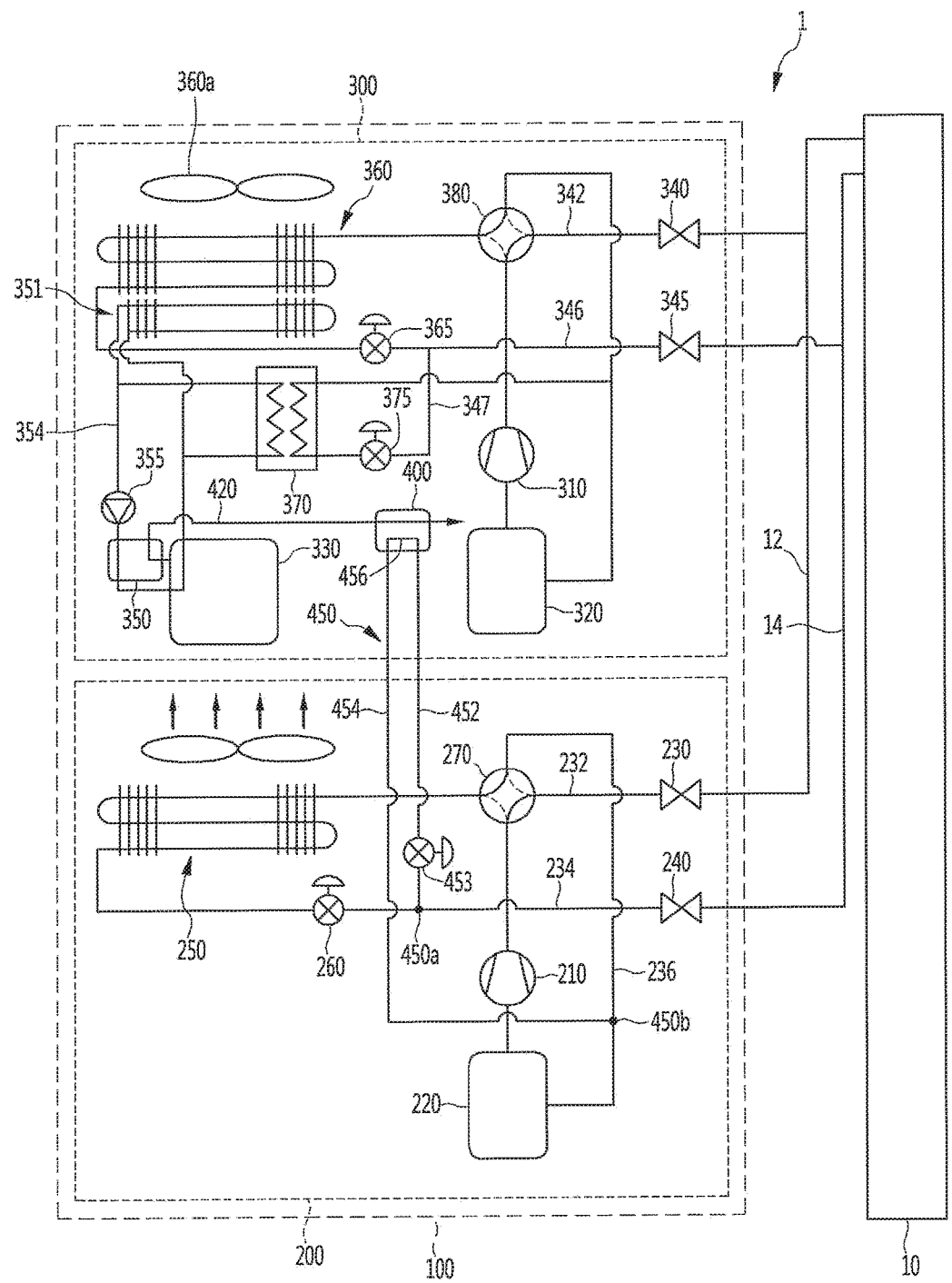
FIG. 1 is a schematic diagram of an air conditioner according to an embodiment.

FIG. 1 is a schematic diagram of an air conditioner according to an embodiment. Referring to FIG. 1, an air conditioner 1 may include an indoor unit or device 10 and an outdoor unit or device 100. One or more indoor device 10 may be provided. The one or more indoor device 10 may be connected to the outdoor device 100, and may cool, warm, or purify indoor air.

The outdoor device 100 may be connected to the one or more indoor device 10 and may perform compressing and expanding, for example, of a refrigerant so as to sufficiently exchange heat. A plurality of outdoor devices 100 may be provided. Hereinafter, as an example, an embodiment having one pair of outdoor devices 100 will be described.

The pair of outdoor devices 100 may include an electric heat pump (EHP) outdoor device 200, which forms an EHP using electric power, and a gas heat pump (GHP) outdoor device 300, which forms a GHP using a gas fuel, such as LPG or LNG. The pair of outdoor devices 100 may further include a circulation pipe 450 that connects the EHP outdoor device 200 with the GHP outdoor device 300.

The EHP outdoor device 200 may be an outdoor device operated using an EHP method and may include a first compressor 210, a first accumulator 220, a pair of connection valves 230 and 240, a first outdoor heat exchanger 250, a first outdoor heat exchanger control valve 260, and a first four-way valve 270. The first compressor 210 may compress a refrigerant and may be driven by applying a voltage. That is, when the voltage is applied to the first compressor 210, the first compressor 210 may compress the refrigerant.

The first accumulator 220 may be installed or provided at a suction side of the first compressor 210 to supply the refrigerant to the first compressor 210. When the refrigerant flows backwards into the first compressor 210 or a liquid refrigerant is suctioned into the first compressor 210, the first compressor 210 may be damaged, and thus, the first accumulator 220 may temporarily store a mixture of oil and refrigerant.

The pair of connection valves 230 and 240 may include first connection valve 230, which may connect a discharge side pipe 232 of the first compressor 210 with a first pipe 12 of the indoor device 10, and second connection valve 240, which may connect a connection pipe 234 of the first outdoor heat exchanger 250 with a second pipe 14 of the indoor device 10.

The connection pipe 234 of the first outdoor heat exchanger 250 may be a pipe that connects a side of the first outdoor heat exchanger 250 with the indoor device 10. For convenience of explanation, the connection pipe 234 of the first outdoor heat exchanger 250 may be referred to as a "first connection pipe". When the air conditioner performs a warming operation, refrigerant condensed in the indoor device 10 may be introduced into the first outdoor heat exchanger 250 via the first connection pipe 234. In this process, the refrigerant may be decompressed in the first outdoor heat exchanger control valve 260.

The first outdoor heat exchanger 250 may evaporate or condense the refrigerant according to a warming operation or a cooling operation of the air conditioner 1. When the air conditioner 1 performs the cooling operation, the refrigerant may be condensed, and when air conditioner 1 performs the warming operation, the refrigerant may be evaporated. An outdoor fan may be installed or provided at a side of the first outdoor heat exchanger 250.

The first outdoor heat exchanger control valve 260 may control a flow of the refrigerant to the first outdoor heat exchanger 250. For example, the first outdoor heat exchanger control valve 260 may include an electronic expansion valve (EEV).

An opening degree of the first outdoor heat exchanger control valve 260 may be controlled according to whether the air conditioner 1 performs the warming or cooling operation. For example, when the air conditioner 1 performs the cooling operation, the refrigerant condensed in the first outdoor heat exchanger 250 may pass through the first outdoor heat exchanger control valve 260 and may flow toward the indoor device 10, and the opening degree of the first outdoor heat exchanger control valve 260 may be controlled so that the refrigerant is not decompressed. When the air conditioner 1 performs the warming operation, the refrigerant condensed in the indoor device 10 may pass through the first outdoor heat exchanger control valve 260 and may flow toward the first outdoor heat exchanger 250, and the opening degree of the first outdoor heat exchanger control valve 260 may be controlled so that the refrigerant is decompressed.

The first four-way valve 270 may switch a path of the refrigerant flowing in the EHP outdoor device 200. When the air conditioner 1 performs the cooling operation, the first four-way valve 270 may guide the refrigerant compressed in the first compressor 210 to the first outdoor heat exchanger 250. When the air conditioner 1 performs the warming operation, the first four-way valve 270 may guide the refrigerant compressed in the first compressor 210 to the indoor device 10. The discharge side pipe 232 of the first compressor 210 may extend to the first connection valve 230 via the first four-way valve 270.

The GHP outdoor device 300 may be an outdoor device operated using a GHP method and may include a second compressor 310, a second accumulator 320, an engine 330, a pair of connection valves 340 and 345, a cooling water heat exchanger 350, a cooling water pump 355, a second outdoor heat exchanger 360, a second outdoor heat exchanger control valve 365, a plate type heat exchanger 370, a plate type heat exchanger control valve 375, a second four-way valve 380, an exhaust gas heat exchanger 400, and an exhaust gas heat exchanger pipe 420. The second compressor 310 may compress the refrigerant and may be operated by driving of the engine 330, which will be described hereinafter. When a driving force is transmitted to the second compressor 310 through the engine 330, the second compressor 310 may compress the refrigerant.

The second accumulator 320 may supply the refrigerant to the second compressor 310. When the refrigerant flows backwards into the second compressor 310 or a liquid refrigerant is suctioned into the second compressor 310, the second compressor 310 may be damaged, and thus, the second accumulator 320 may temporarily store a mixture of oil and refrigerant.

The engine 330 may transmit the driving force to the second compressor 310 and may be operated by burning gas fuel, such as LPG or LNG. The GHP outdoor device 300 may be operated using the GHP method by combustion gas through the engine 330.

The pair of connection valves 340 and 345 may include a third connection valve 340 that connects a discharge side pipe 342 of the second compressor 310 with the first pipe 12 of the indoor device 10 and a fourth connection valve 345 that connects a connection pipe 346 of the second outdoor heat exchanger 360 with the second pipe 14 of the indoor device 10. The connection pipe 346 of the second outdoor heat exchanger 360 may be a pipe that connects the second outdoor heat exchanger 360 with the indoor device 10. For convenience of explanation, the connection pipe 346 of the second outdoor heat exchanger 360 may be referred to as a "second connection pipe".

The cooling water heat exchanger 350 may be provided at a side of the engine 330 to cool the engine 330. The cooling water heat exchanger 350 may absorb heat from the engine 330, which may be overheated according to the driving of the engine 330.

The GHP outdoor device 300 may further include a cooling water pipe 354 that guides a flow of cooling water to cool the engine 330. The cooling water pipe 354 may be connected with the cooling water heat exchanger 350.

The cooling water pump 355, which may generate a flowing force of the cooling water, and a radiator 351, which may cool the cooling water, may be installed or provided at the cooling water pipe 354. The radiator 351 may be provided at a side of the second outdoor heat exchanger 360, and the cooling water of the radiator 351 may exchange heat with external air by driving of an outdoor fan 360a, and may be cooled through this process.

The cooling water pump 355 may provide the flowing force of the cooling water and may be installed or provided at the cooling water pipe 354. The cooling water passed through the cooling water pump 355 may be supplied to the cooling water heat exchanger 350 via the cooling water pipe 354.

The second outdoor heat exchanger 360 may evaporate or condense the refrigerant according to the warming operation or the cooling operation of the air conditioner 1. When the air conditioner 1 performs the cooling operation, the refrigerant may be condensed, and when the air conditioner 1 performs the warming operation, the refrigerant may be evaporated. The outdoor fan 360a may be installed or provided at a side of the second outdoor heat exchanger 360.

The second outdoor heat exchanger control valve 365 may control a flow of the refrigerant to the second outdoor heat exchanger 360 and may be installed or provided at or on the connection pipe 346. As the second outdoor heat exchanger control valve 365 is similar to the first outdoor heat exchanger control valve 260, detailed description thereof has been omitted.

The plate type heat exchanger 370 may be a heat exchanger in which a low pressure refrigerant may exchange heat with high temperature cooling water. The cooling water may be cooled while exchanging heat in the plate type heat exchanger 370, and the refrigerant may be evaporated in this process.

The plate type heat exchanger control valve 375 may be provided at a connection pipe 347 of the plate type heat exchanger 370 and may control a flow of the refrigerant to the plate type heat exchanger 370. The connection pipe 347 of the plate type heat exchanger 370 may branch from the connection pipe 346 of the second outdoor heat exchanger 360 and may extend to the plate type heat exchanger 370. The plate type heat exchanger control valve 375 may be installed or provided parallel with the second outdoor heat exchanger control valve 365.

The second four-way valve 380 may switch a path of the refrigerant flowing in the GHP outdoor device 300. As the second four-way valve 380 is similar to the first four-way valve 270, detailed description thereof has been omitted.

The exhaust gas heat exchanger 400 may discharge exhaust heat of the engine 330 and may be provided at a discharge side of the engine 330. The exhaust gas heat exchanger 400 may also enable the exhaust gas generated after burning of a mixed fuel to be introduced therein.

The exhaust gas heat exchanger pipe 420 may connect the engine 330 with the exhaust gas heat exchanger 400 and may guide the exhaust gas generated from the engine 330 to the exhaust gas heat exchanger 400. The exhaust gas heat exchanger pipe 420 may extend from the engine 330 to the exhaust gas heat exchanger 400 via the cooling water heat exchanger 350.

The exhaust gas heat exchanger 400 may transfer the exhaust heat of the engine 330 to the EHP outdoor device 200. That is, the GHP outdoor device 300 and the EHP outdoor device 200 may exchange heat with each other through the exhaust gas heat exchanger 400.

The circulation pipe 450 may connect the EHP outdoor device 200 with the engine 330 and may guide the refrigerant of the EHP outdoor device 200 toward the exhaust gas heat exchanger 400 of the GHP outdoor device 300. A first end 450*a* of the circulation pipe 450 may be coupled to the first connection pipe 234, and a second end 450*b* of the circulation pipe 450 may be coupled to a connection pipe 236 of the first accumulator 220.

The first connection pipe 234 may be a pipe at or on which the first outdoor heat exchanger control valve 260 may be installed or provided. When the air conditioner 1 performs the cooling operation, the refrigerant condensed in the first outdoor heat exchanger 250 may flow through the first connection pipe 234, and when the air conditioner 1 performs the warming operation, the refrigerant condensed in the indoor device 10 may flow through the first connection pipe 234. For example, the first connection pipe 234 may include a liquid pipe.

The connection pipe 236 may be a pipe that guides the refrigerant to the first accumulator 220 through which the low pressure refrigerant may flow. The connection pipe 236 may be referred to as a "suction pipe" which may suction the refrigerant into the first compressor 210. The suction pipe 236 may extend from another side of the first outdoor heat exchanger 250 to the first compressor 210.

The circulation pipe 450 may include a first circulation pipe 452, a second circulation pipe 454, and a third circulation pipe 456. The first circulation pipe 452 may connect the first connection pipe 234 with the exhaust gas heat exchanger 400. That is, the first circulation pipe 452 may extend from the first end 450*a* of the circulation pipe 450 toward the exhaust gas heat exchanger 400. The first end 450*a* may be a part or portion of the first circulation pipe 452.

The second circulation pipe 454 may connect the connection pipe 236 of the first accumulator 220 with the exhaust gas heat exchanger 400. That is, the second circulation pipe 454 may extend from the second end 450*b* of the circulation pipe 450 toward the exhaust gas heat exchanger 400. The second end 450*b* may be a part or portion of the second circulation pipe 454.

Figure 2:
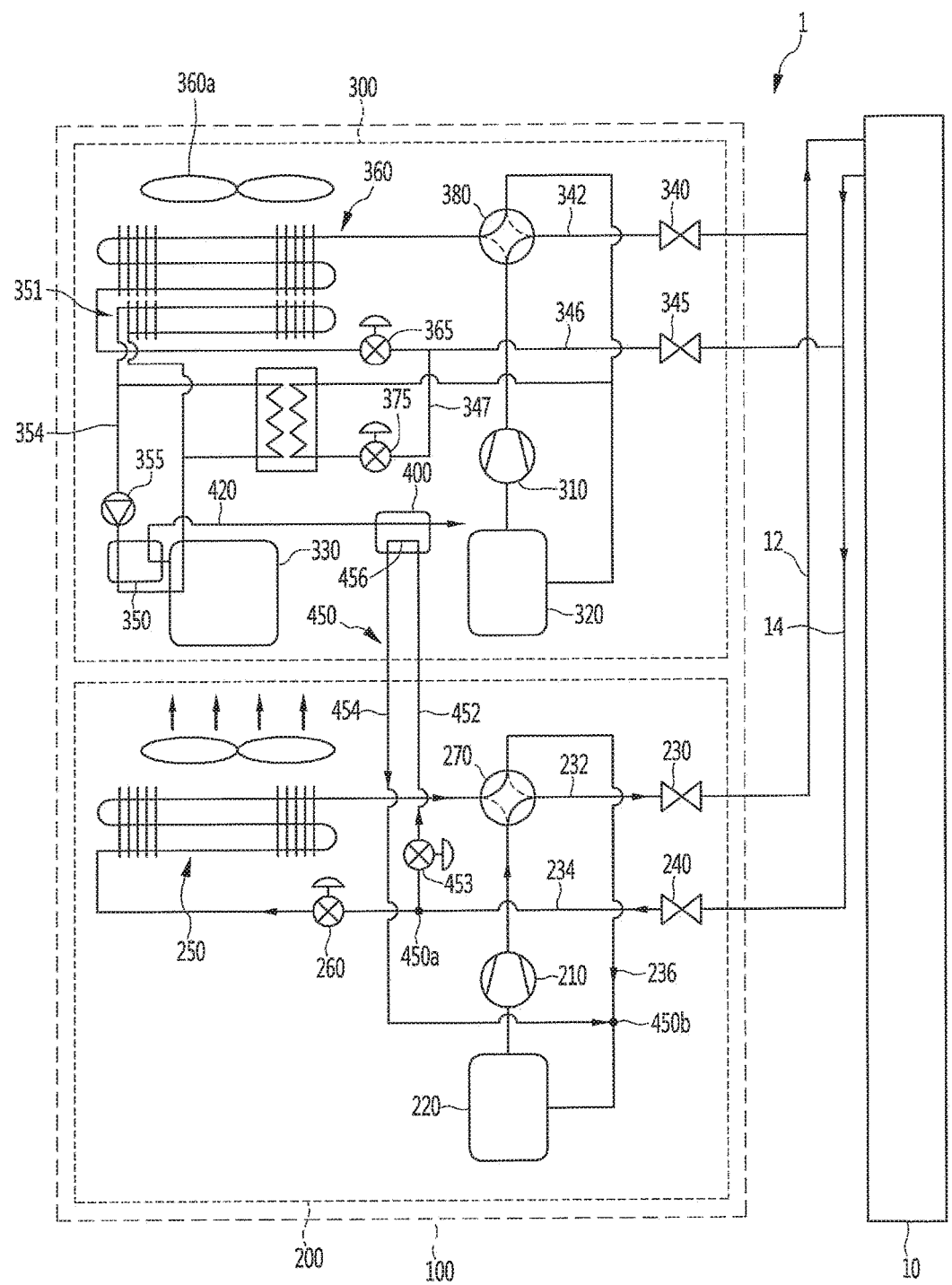
FIG. 2 is a schematic diagram illustrating an operation of the air conditioner of FIG. 1.

A circulation control valve 453 may be installed or provided at or on the first circulation pipe 452 or the second circulation pipe 454. FIGS. 1 and 2 show the circulation control valve 453 provided at or on the first circulation pipe 452. However, the circulation control valve 453 may be installed or provided at or on the second circulation pipe 454.

The circulation control valve 453 may include an electronic expansion valve (EEV). The circulation control valve 453 may control the supply or flow of the refrigerant, which may be circulated through the circulation pipe 450.

The third circulation pipe 456 may be provided inside of the exhaust gas heat exchanger 400. The first circulation pipe 452 and the second circulation pipe 454 may be coupled to the exhaust gas heat exchanger 400, and the third circulation pipe 456 may be connected to the first circulation pipe 452 and the second circulation pipe 454 and may extend to the inside of the exhaust gas heat exchanger 400.

Based on such a configuration, the circulation pipe 450 may be branched from a first point of a refrigerant pipe of the EHP outdoor device 200, pass through the exhaust gas heat exchanger 400, and then be joined again to a second point of the refrigerant pipe of the EHP outdoor device 200. The first point of the refrigerant pipe of the EHP outdoor device 200 may correspond to the first end 450*a* of the circulation pipe 450, and the second point of the refrigerant pipe of the EHP outdoor device 200 may correspond to the second end 450*b* of the circulation pipe 450.

FIG. 2 is a schematic diagram illustrating an operation of the air conditioner of FIG. 1. Referring to FIG. 2, when the air conditioner 1 performs the warming operation, the EHP outdoor device 200 that forms the EHP and the GHP outdoor device 300 that forms the GHP may be combined and driven together.

In the EHP outdoor device 200, a high temperature gas refrigerant compressed in the first compressor 210 may be transferred to the indoor device 10, and a low temperature liquid refrigerant may be introduced from the indoor device 10. The high temperature gas refrigerant may flow through the discharge side pipe 232 of the first compressor 210, may pass through the first four-way valve 270, and may be transferred to the indoor device 10 through the first connection valve 230 and the first pipe 12. The low temperature liquid refrigerant condensed in the indoor device 10 may be introduced into the EHP outdoor device 200 through the second pipe 14 and the second connection valve 240. The refrigerant introduced into the EHP outdoor device 200 may flow through the first connection pipe 234.

In the GHP outdoor device 300, the high temperature gas refrigerant compressed in the second compressor 310 may be transferred to the indoor device 10, and the low temperature liquid refrigerant may be introduced from the indoor device 10. The high temperature gas refrigerant may flow through the discharge side pipe 342 of the second compressor 310, may pass through the second four-way valve 380, and may be transferred to the indoor device 10 through the third connection valve 340 and the first pipe 12. The refrigerant of the GHP outdoor device 300 that flows through the first pipe 12 may be mixed with the refrigerant discharged from the EHP outdoor device 200 and then may flow to the indoor device 10.

In the EHP outdoor device 200, the low temperature liquid refrigerant introduced into the EHP outdoor device 200 may be introduced into the first outdoor heat exchanger 250 and may exchange heat with the air, or may be evaporated. Then, the evaporated refrigerant may pass through the suction pipe 236, may be introduced into the first accumulator 220, and may be suctioned into the first compressor 210. Such a flow of the refrigerant may be continuously performed in the EHP outdoor device 200.

At least some of the refrigerant flowing through the first connection pipe 234 may branch at the first end 450*a* and may be introduced into the circulation pipe 450. The circulation control valve 453 may be opened. When the circulation control valve 453 is opened, the refrigerant in the first connection pipe 234 may be introduced from the first end 450*a* into the first circulation pipe 452, may be introduced into the exhaust gas heat exchanger 400, and may flow through the third circulation pipe 456. In this process, the refrigerant may be evaporated by the high temperature exhaust gas in the exhaust gas heat exchanger 400.

The exhaust heat of the engine introduced into the exhaust gas heat exchanger 400 generally may have a higher temperature than a surrounding atmosphere. Therefore, the low temperature liquid refrigerant that flows through the circulation pipe 450 may absorb more heat than the refrigerant heat-exchanged in the first outdoor heat exchanger 250, while exchanging heat with the exhaust gas discharged from the exhaust gas heat exchanger 400. Eventually, a temperature of the refrigerant evaporated in the exhaust gas heat exchanger 400 may be higher than a temperature of the refrigerant evaporated in the first outdoor heat exchanger 250.

The evaporated refrigerant may be introduced into the second circulation pipe 454 and may be introduced from the second end 450*b* into the suction pipe 236. That is, the refrigerant in the second circulation pipe 454 may be evaporated in the first outdoor heat exchanger 250 and may be mixed with the refrigerant flowing through the suction pipe 236. The mixed refrigerant may pass through the suction pipe 236, may be introduced into the first accumulator 220, and may be suctioned into the first compressor 210.

As described above, when the air conditioner 1 performs the warming operation, the low temperature liquid refrigerant introduced into the EHP outdoor device 200 may exchange heat with the first outdoor heat exchanger 250 and the exhaust gas heat exchanger 400, and may be evaporated. Thus, evaporation performance may be improved. Thus, operation performance and efficiency of the EHP outdoor device 200 may be improved.

In the GHP outdoor device 300, as the exhaust heat of the overheated engine is radiated through the exhaust gas heat exchanger 400, and the cooled exhaust gas is discharged to the outside, operation performance and efficiency of the GHP outdoor device 300 may be prevented from being reduced. The exhaust heat, which may be abandoned among waste heat of the engine of the GHP outdoor device 300, may be recovered at the EHP outdoor device 200, and thus, performance and efficiency of the EHP outdoor device 200 may be enhanced.

The air conditioner 1 according to embodiments disclosed herein may include the outdoor device 100 having improved performance and efficiency by combining the EHP outdoor device 200 with the GHP outdoor device 300. Thus, the air conditioner 1 according to embodiments may provide an air conditioner, which may have further improved performance and efficiency.

According to the air conditioner having the above-described configuration, as at least some of the refrigerant flowing through the EHP outdoor device may be transferred to the GHP outdoor device and may exchange heat, operation performance and efficiency of the EHP outdoor device may be improved. For example, as the refrigerant in the EHP outdoor device is supplied to the exhaust gas heat exchanger provided at the GHP outdoor device and may be evaporated while exchanging heat with the exhaust gas, evaporation performance may be improved.

Also, in the GHP outdoor device, as the exhaust heat of the overheated engine may be radiated through the exhaust gas heat exchanger, and the cooled exhaust gas may be discharged to the outside, operation performance and efficiency of the GHP outdoor device may be prevented from being degraded.

The exhaust heat, which may be abandoned among or from waste heat of the engine of the GHP outdoor device, may be recovered at the EHP outdoor device, and thus, performance and efficiency of the EHP outdoor device may be enhanced.

Also, the air conditioner may include the outdoor device having improved performance and efficiency by combining the EHP outdoor device with the GHP outdoor device. Therefore, performance and efficiency of the air conditioner may be further improved.

An air conditioner according to embodiments disclosed herein which may improve performance and efficiency is provided. Embodiments disclosed herein provide an air conditioner that may include at least one indoor unit or device; an EHP outdoor unit or device connected with the at least one indoor unit, and having a first compressor driven using electric power and a first outdoor heat exchanger; and a GHP outdoor unit or device connected with the at least one indoor unit, and having an engine that drives a second compressor through a combustion gas and a second outdoor heat exchanger. The GHP outdoor unit may include an exhaust gas heat exchanger that performs heat-exchanging between refrigerant flowing through the EHP outdoor device and exhaust gas of the engine. The air conditioner may further include a circulation pipe that extends from the EHP outdoor unit to the exhaust gas heat exchanger and supplies the refrigerant in the EHP outdoor unit to the exhaust gas heat exchanger.

The EHP outdoor unit may further include a first connection pipe that connects the indoor unit with the first outdoor heat exchanger, and a suction pipe that suctions and guides the refrigerant to the first compressor. The circulation pipe may include a first end, which may be coupled to the first connection pipe, and a second end, which may be coupled to the suction pipe. The circulation pipe may include a first circulation pipe, which may be branched from the first connection pipe and extend to the exhaust gas heat exchanger, and a second circulation pipe, which may extend from the exhaust gas heat exchanger and may be joined to a second connection pipe. The circulation pipe may further include a third circulation pipe, which may be connected to the first circulation pipe and the second circulation pipe and disposed or provided inside the exhaust gas heat exchanger.

The EHP outdoor unit may further include a first accumulator, which may be installed or provided at a suction side of the first compressor and may supply the refrigerant to the first compressor, and when the air conditioner performs a warming operation, the refrigerant condensed in the indoor unit may be introduced into the first outdoor heat exchanger via the first connection pipe, and the refrigerant evaporated in the first outdoor heat exchanger may be introduced into the first accumulator via the suction pipe. The GHP outdoor unit may further include a second accumulator, which may be installed or provided at a suction side of the second compressor and may supply the refrigerant to the second compressor, and the refrigerant evaporated in the second outdoor heat exchanger may be introduced into the second accumulator.

The air conditioner may further include a circulation control valve, which may be installed or provided at the first circulation pipe or the second circulation pipe to control a flow rate of the refrigerant supplied toward the exhaust gas heat exchanger. The circulation control valve may include an electronic expansion valve (EEV).

The EHP outdoor unit may further include a first connection valve that connects a discharge side pipe of the first compressor with a first pipe of the indoor unit, and a second connection valve that connects the first connection pipe with a second pipe of the indoor unit.

The GHP outdoor unit may further include an exhaust gas heat exchanger pipe that connects the engine with the exhaust gas heat exchanger and guides an exhaust gas generated from the engine to the exhaust gas heat exchanger. The GHP outdoor unit may further include a cooling water heat exchanger, which may be provided at one side of the engine to absorb heat of the engine using cooling water, and a cooling water pipe, which may be connected with the cooling water heat exchanger and may guide a flow of the cooling water for cooling the engine. The exhaust gas heat exchanger pipe may extend from the engine to the exhaust gas heat exchanger via the cooling water heat exchanger.

The air conditioner may further include a cooling water pump, which may be installed or provided at the cooling water pipe and may generate a flowing force of the cooling water, and a radiator, which may be installed or provided at one side of the first outdoor heat exchanger to exchange heat with external air and to cool the cooling water.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
at least one indoor device;
an electric heat pump (EHP) outdoor device connected with the at least one indoor device, and having a first compressor driven using electric power and a first outdoor heat exchanger;
a circulation pipe that extends from the EHP outdoor device; and
a gas heat pump (GHP) outdoor device connected with the at least one indoor device, and having an engine that drives a second compressor using a combustion gas and a second outdoor heat exchanger, wherein the GHP outdoor device includes:
a cooling water heat exchanger provided at one side of the engine to absorb heat of the engine using cooling water;
an exhaust gas heat exchanger that performs heat exchange between a refrigerant flowing through the EHP outdoor device and an exhaust gas of the engine; and
an exhaust gas heat exchanger pipe that connects the engine with the exhaust gas heat exchanger and guides the exhaust gas generated from the engine to the exhaust gas heat exchanger, and
wherein the circulation pipe extends from the EHP outdoor device to the exhaust gas heat exchanger and supplies the refrigerant in the EHP outdoor device to the exhaust gas heat exchanger.

2. The air conditioner according to claim 1, wherein the EHP outdoor device further includes:
a first connection pipe that connects the at least one indoor device with the first outdoor heat exchanger, and a suction pipe that guides suction of the refrigerant to the first compressor.

3. The air conditioner according to claim 2, wherein the circulation pipe includes a first end, which is coupled to the first connection pipe, and a second end, which is coupled to the suction pipe.

4. The air conditioner according to claim 2, wherein the circulation pipe includes:
a first circulation pipe, which is branched from the first connection pipe and extends to the exhaust gas heat exchanger; and
a second circulation pipe, which extends from the exhaust gas heat exchanger and connects to a second connection pipe of the second outdoor heat exchanger.

5. The air conditioner according to claim 4, wherein the circulation pipe further includes a third circulation pipe, which is connected to the first circulation pipe and the second circulation pipe and provided inside of the exhaust gas heat exchanger.

6. The air conditioner according to claim 5, further including a circulation control valve, which is provided at the first circulation pipe or the second circulation pipe to control a flow rate of the refrigerant supplied toward the exhaust gas heat exchanger.

7. The air conditioner according to claim 6, wherein the circulation control valve includes an electronic expansion valve (EEV).

8. The air conditioner according to claim 2, wherein the EHP outdoor device further includes a first accumulator, which is provided at a suction side of the first compressor and supplies the refrigerant to the first compressor, and when the air conditioner performs a warming operation, the refrigerant condensed in the indoor device is introduced into the first outdoor heat exchanger via the first connection pipe, and the refrigerant evaporated in the first outdoor heat exchanger is introduced into the first accumulator via the suction pipe.

9. The air conditioner according to claim 2, wherein the EHP outdoor device further includes a first connection valve that connects a discharge side pipe of the first compressor with a first pipe of the at least one indoor device, and a second connection valve that connects the first connection pipe with a second pipe of the at least one indoor device.

10. The air conditioner according to claim 1, wherein the GHP outdoor device further includes a second accumulator, which is provided at a suction side of the second compressor and supplies the refrigerant to the second compressor, and the refrigerant evaporated in the second outdoor heat exchanger is introduced into the second accumulator.

11. The air conditioner according to claim 1, wherein the GHP outdoor device further includes:
a cooling water pipe that connects with the cooling water heat exchanger and guides a flow of the cooling water for cooling the engine.

12. The air conditioner according to claim 11, further including:
a cooling water pump provided at the cooling water pipe and that generates a flowing force of the cooling water; and
a radiator provided at a side of the first outdoor heat exchanger to exchange heat with external air and to cool the cooling water.

13. The air conditioner according to claim 1, wherein the exhaust gas heat exchanger pipe extends from the engine to the exhaust gas heat exchanger via the cooling water heat exchanger.

14. An air conditioner, comprising:
at least one indoor device;
an electric heat pump (EHP) outdoor device, which communicates with the at least one indoor device, having a first compressor driven using electric power and a first outdoor heat exchanger; and
a gas heat pump (GHP) outdoor device, which communicates with the at least one indoor device, wherein the GHP outdoor device includes:

an engine that uses a gas fuel to drive a second compressor;

a second outdoor heat exchanger;

a cooling water heat exchanger provided at one side of the engine to absorb heat of the engine using cooling water;

an exhaust gas heat exchanger that performs heat exchange between a refrigerant from the EHP outdoor device and an exhaust gas from the engine;

a circulation pipe that connects the exhaust gas heat exchanger to the EHP outdoor device to supply the refrigerant in the EHP outdoor device to the exhaust gas heat exchanger;

an exhaust gas heat exchanger pipe that connects the engine with the exhaust gas heat exchanger and guides the exhaust gas generated from the engine to the exhaust gas heat exchanger.

15. The air conditioner according to claim 14, wherein a portion of the circulation pipe is provided inside of the exhaust gas heat exchanger.

16. The air conditioner according to claim 14, wherein the EHP outdoor device further includes:

a first connection pipe that connects the at least one indoor device with the first outdoor heat exchanger, and a suction pipe that guides suction of the refrigerant to the first compressor.

17. The air conditioner according to claim 16, wherein the circulation pipe includes:

a first circulation pipe, which is branched from the first connection pipe and extends to the exhaust gas heat exchanger; and a second circulation pipe, which extends from the exhaust gas heat exchanger and connects to a second connection pipe of the second outdoor heat exchanger.

\* \* \* \* \*